United States Patent [19]

Merrifield et al.

[11] Patent Number: 5,366,810
[45] Date of Patent: Nov. 22, 1994

[54] WATER-REPELLENT WALLBOARD

[75] Inventors: James H. Merrifield, Ballston Spa; Donna A. Riccio, Watervliet, both of N.Y.

[73] Assignee: General Electric Company, Waterford, N.Y.

[21] Appl. No.: 959,307

[22] Filed: Oct. 9, 1992

[51] Int. Cl.$^5$ ................................................ B32B 9/06
[52] U.S. Cl. .................................. 428/448; 428/449; 427/387; 427/395; 427/209
[58] Field of Search ................ 428/449, 448; 427/387, 427/395, 209

[56] References Cited

U.S. PATENT DOCUMENTS

| | | | |
|---|---|---|---|
| 4,258,102 | 3/1981 | Traver et al. | 428/331 |
| 4,275,172 | 6/1981 | Barth et al. | 521/112 |
| 4,447,498 | 5/1984 | Fink et al. | 428/447 |
| 4,643,771 | 2/1987 | Steinbach et al. | 106/111 |
| 4,657,594 | 4/1987 | Struss | 106/308 |
| 4,835,014 | 5/1989 | Roth et al. | 427/299 |
| 4,853,085 | 8/1989 | Johnstone et al. | 162/128 |
| 4,975,122 | 12/1990 | Parkinson et al. | 106/727 |
| 5,110,684 | 5/1992 | Cooper | 428/447 |

*Primary Examiner*—John C. Bleutge
*Assistant Examiner*—Margaret W. Glass

[57] ABSTRACT

The present invention provides a novel method of rendering a wallboard water-repellent comprising applying to the wallboard a water-repellent composition comprising a hydrogen siloxane component and a high molecular weight silicone.

2 Claims, No Drawings

WATER-REPELLENT WALLBOARD

The present invention relates to water-repellent wallboard. More particularly, the present invention relates to water-repellent wallboard which is treated with a silicone hydride. Most particularly, the present invention relates to water-repellent wallboard which is treated with a blend of a silicone hydride and a high viscosity silicone fluid.

BACKGROUND OF THE PRESENT INVENTION

Wallboard or gypsum board is well-known. Generally, gypsum board is formed by first preparing the gypsum paper in paper making machines. Typically, the gypsum paper is manufactured by driving the plies through a sizing bath which may contain alum and/or rosin for sizing the gypsum paper; whereupon the gypsum paper is then formed to the desired thickness and collected off the end of the machine. Gypsum board is then prepared from the sheets of gypsum paper by putting a gypsum mixture between the sheets of gypsum paper to form a composite sandwich of gypsum paper and gypsum mixture. The composite board is then semi-dried and cut to the desired lengths. The cut lengths of the board are then put into a high temperature kiln to complete the drying of the gypsum board.

Water-repellent wallboard or gypsum board can be prepared by several methods. The most common method practiced in the industry is the blending of an asphalt emulsion into the wallboard paste or mixture. While this method produces a wallboard having good water repellency, it has the distinct disadvantage of needing to maintain the asphalt emulsion in a molten state during processing. Due to this requirement, wallboard plants must plan well in advance if they wish to make a batch of water-repellent wallboard.

It is also known in the art that silicone hydride fluids can be added to gypsum to make water-repellent mixtures for use in preparing water-repellent building materials. Roth et al., U.S. Pat. No. 4,835,014, disclose a method for imparting water repellency to an absorbent inorganic building material which comprises contacting at least a portion of the surface of the building material which is to be rendered water-repellent with at least partially liquid water having a temperature of from 0° to about 150° C. and thereafter applying a solution containing an organosilicone compound which imparts water repellency to an inorganic building material and a water-immiscible solvent to the wet surface.

Steinbach et al., U.S. Pat. No. 4,643,771, disclose a process for the production of a water-repellent porous plaster molding consisting essentially of producing a foam from water, an organosulfonate or organosulfate foaming agent and polymethyl-hydrogen-siloxane, adding this foam to a paste of plaster powder in water, and letting the mixture set, the surfactant and the siloxane each being present in 0.1 to 0.5 part by weight per 100 parts by weight of the plaster.

Traver et al., U.S. Pat. No. 4,258,102, disclose treating gypsum paper with a mixture of a silanol organopolysiloxane polymer where the polymer has a viscosity varying from 1,000 to 1,000,000 centipoise at 25° C. and in which there is mixed a liquid suspension of colloidal silica.

However, it has been found that when the silicone fluids of the prior art are employed in preparing water-repellent froths for use in rendering wallboard water-repellent, there is a significant increase in the froth density, i.e., defoaming, which detrimentally affects the weight to strength ratio of the finished wallboard product. Attempts to solve this problem have included the use of additional amounts of soap. However, while this succeeded in decreasing the froth density, it also concurrently resulted in a reduction in water repellency.

It would therefore represent a notable advance in the state of the art if a silicone fluid could be provided which provided for improved water repellency and which does not detrimentally effect the strength of the finished wallboard product.

SUMMARY OF THE PRESENT INVENTION

To this end, according to the present invention there is provided a method for imparting water repellency to an inorganic building material comprising applying to the inorganic building material a mixture prepared from water, a surfactant, a hydrogen-modified siloxane and a high molecular weight silicone.

Also according to the present invention there is provided a water-repellent wallboard comprising an inorganic building material treated with a mixture comprising water, a surfactant, a hydrogen-modified siloxane, and a high molecular weight silicone.

Still further, according to the present invention there is provided a composition for rendering a wallboard water-repellent, the composition comprising water, a surfactant, a hydrogen-modified siloxane and a high molecular weight silicone.

DETAILED DESCRIPTION OF THE PRESENT INVENTION

The water-repellent compositions of the present invention for preparing the water-repellent wallboards of the present invention generally comprise a mixture or a froth prepared from water, at least one surfactant or frothing agent, a hydrogen siloxane fluid and a high molecular weight silicone.

The hydrogen siloxane fluid is generally a linear hydrogen-modified siloxane, but can also be a cyclic hydrogen-modified siloxane. Such fluids are well known to those of ordinary skill in the art, are commercially available and are described in the patent literature. Typically, the linear hydrogen-modified siloxanes useful in the practice of the present invention comprise those of the general formula:

wherein R represents a saturated or unsaturated monovalent hydrocarbon radical. In preferred embodiments, R represents an alkyl group, and most preferably R is methyl.

The water-repellent compositions of the present invention can include from about 20 to about 60 percent by weight of the hydrogen-modified siloxane, and preferably they comprise from about 40 to about 50 percent by weight of the hydrogen-modified siloxane, based on the total weight of the water-repellent composition.

The high-molecular weight silicones useful in the practice of the present invention generally have a weight average molecular weight ranging from about 50,000 to about 300,000, more preferably from about 75,000 to about 200,000. Typically effective high molecular weight silicones are organopolysiloxane polymers comprised of chemically combined siloxy units typically selected from the group consisting of $R_3SiO_{0.5}$, $R_2SiO$, $R^1SiO_{1.5}$, $R^1R_2SiO_{0.5}$, $RR^1SiO$, $(R^1)_2SiO$, $RSiO_{1.5}$ and $SiO_2$ units and mixtures thereof wherein each R represents independently a saturated or unsaturated monovalent hydrocarbon radical, $R^1$ represents a radical such as R or a radical selected from the group consisting of hydroxyl, alkoxy, aryl, vinyl, or allyl radicals etc. Typically, R is an alkyl group, such as methyl. These silicones are available commercially and are well known to those skilled in the art.

In preferred embodiments, the high-molecular weight silicones comprise MQ resins comprised of monofunctional M units of the average formula $R_3SiO_{0.5}$ and tetrafunctional Q units of the average formula $SiO_2$, where R is as defined above, and is typically methyl, having a specified ratio of M to Q units. A notably effective silicone resin for use in the present invention is polytrimethylsilylsilicate which can have a ratio of, approximately, 0.3 to 4.0M units per Q unit, most preferably 0.6–1.0.

In a preferred embodiment, the MQ resin is employed in the present invention in the form of a solution in a hydrocarbon solvent. The hydrocarbon solvent can be any normally liquid aromatic hydrocarbon, typically selected from, but not limited to toluene, xylene or mixtures thereof. Typically from about 5 to about 90 weight percent of MQ resin is dissolved in the solvent.

Another high molecular weight silicone useful in the practice of the present invention are the room temperature vulcanizable silicone elastomers, i.e. where $R^1$ is hydroxy or alkoxy.

Silanol chain-stopped polydiorganosiloxanes for use as the high molecular weight silicone in the present invention may be represented by the formula:

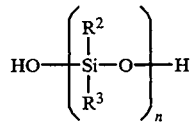

wherein $R^2$ and $R^3$ are each organic radicals of up to 20, and preferably up to 8 carbon atoms, selected from hydrocarbyl, halohydrocarbyl and cyano lower alkyl and n is a number that varies generally from about 10 to 15,000, preferably from 100 to 3,000, and more preferably from 300 to 1,500.

The silanol chain-stopped polydiorganosiloxanes are well known in the art and they may be prepared by known methods, such as described in Beers, U.S. Pat. No. 3,382,205 and include compositions containing different $R^2$ and $R^3$ groups. For example, the $R^2$ groups can be methyl, while the $R^3$ groups can be phenyl and/or beta-cyano-ethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units, and methylphenyl siloxane units, or, for example, copolymers of dimethylsiloxane units, methylphenylsiloxane units and methylvinyl siloxane units. Generally, at least 50% of the $R^2$ and $R^3$ groups of the silanol chain-stopped polydiorganosiloxanes are alkyl, e.g., methyl groups.

Another useful room temperature vulcanizing silicone elastomer are di-alkoxy end-stopped dialkylsiloxane fluids. These are well known in the art and are available commercially. See, for example, Lucas et al., U.S. Pat. No. 4,483,973; and Surprenant, U.S. Pat. No. 4,461,867. Particularly useful are dimethoxy end-stopped dimethylsiloxane fluids.

The high molecular weight silicones are employed in the water-repellent compositions of the present invention in amounts ranging from about 0.1 weight percent to about 10 weight percent, preferably from about 0.5 weight percent to about 3 weight percent based on the total weight of the water-repellent composition.

Any of the known frothing agents may be employed as a surfactant in the practice of the present invention. In particular, the class of substances comprising organosulfonates or organosulfates may be employed. Typically, these include the alkylaryl sulfates or alkylaryl sulfonates, for example, sodium salts of alkylbenzenesulfonates, lauryl sulfate or alkylglycolether sulfate. These surfactants are available commercially, such as Cedepal ® FA-406 from Stepan Company.

Generally, the surfactant or frothing agent concentration employed in the practice of the present invention is from about 0.01 weight percent to about 5 weight percent, preferably from about 0.02 to about 1 weight percent based on the total weight of the water-repellent composition.

The water-repellent compositions of the present invention also comprise water, generally in amounts ranging from about 35 weight percent to about 65 weight percent, most preferably from about 40 weight percent to about 50 weight percent based on the total weight of the water-repellent composition.

The mixture of water, surfactant, silicone hydride and high molecular weight siloxane is then generally combined with a basic inorganic building material in order to prepare a gypsum-containing mixture for use in preparing the water-repellent wallboard. The basic inorganic building materials which are combined with the water-repellent compositions are typically the same as the alkaline inorganic building materials which make up the wallboard. Accordingly, the basic inorganic materials include, but are not limited to, gypsum, potash, stucco, plaster, lime, sandstone, cement, brick, slag brick, marble, etc. Particularly useful herein is gypsum.

The basic inorganic compounds are typically combined with the water-repellent compositions of the present invention in amounts ranging from about 35 weight percent to about 70 weight percent, preferably from about 45 weight percent to about 60 weight percent based on the total weight of the mixture.

The water-repellent wallboards of the present invention can be conveniently prepared by methods known to those skilled in the art. In one embodiment, a line of basic inorganic material, such as gypsum, is combined with a line of water, surfactant, hydrogen-modified siloxane and high molecular weight silicone, in desired proportions, and delivered to a mixer. The materials are mixed and can also be whipped to provide a froth.

The froth is then applied to the wallboard, such as by placing the froth between the sheets of gypsum paper to form the water-repellent wallboards of the present invention. In preferred embodiments of the present invention, the wallboard can then be heated, such as in a kiln, to a temperature in the range of 75° to 500° C. for a period of time varying from 1 second to 10 minutes.

Additionally, the froths of the present invention may comprise other substances normally added to the water repellent compositions including fillers and other hydrophobic materials.

DESCRIPTION OF THE PREFERRED EMBODIMENTS

The following examples illustrate the present invention. They are not to be construed to limit the claims in any manner whatsoever.

EXAMPLES 1–3

200 grams of water and 0.38 grams of Cedepal® FA-406 surfactant are mixed and then whipped in a high speed blender for approximately 30 seconds. The froth height is then measured.

To the froth is then added 13.2 grams of a 90:10 DF1040:silicone blend. The DF1040 is a methylhydrogen siloxane available from General Electric Company; and the silicone is varied in each example. The mixture is then whipped at high speed for an additional 30 seconds. The froth height is measured and the stability of the froth is evaluated based on the time for the froth height to decrease.

For comparative purposes, the procedure above is followed except that after forming the initial froth, 13.2 g of DF1040 is added and the mixture is whipped at high speed for 30 seconds and the froth height is measured. To this froth is then added other materials, the mixture is whipped again for 30 seconds at high speed and the froth height is measured.

A control example was also run, wherein no additional materials were added. The initial froth height was 5.5 inches, and the ending froth height was 0.5 inches.

The results, along with compositional data are set forth in Table 1 below.

TABLE 1

| Example | 1A* | 1B* | 1C* | 1D* | 1 | 2 | 3 |
|---|---|---|---|---|---|---|---|
| Composition, grams | | | | | | | |
| Water | 200 | 200 | 200 | 200 | 200 | 200 | 200 |
| Surfactant[a] | 0.38 | 0.38 | 0.38 | 0.38 | 0.38 | 0.38 | 0.38 |
| DF 1040[b] | 13.2 | 13.2 | 13.2 | 13.2 | 11.88 | 11.88 | 11.88 |
| Additive | 0.25[c] | 0.25[d] | 0.25[e] | 0.25[f] | 1.32[g] | 1.32[h] | 1.32[i] |
| Results | | | | | | | |
| Initial froth height, in | 5.5 | 5.5 | 6.5 | 5.5 | 6.0 | 6.0 | 6.0 |
| Ending froth height, in | 2.25 | 0.5 | 4.0 | 0.5 | 6.0 | 6.0 | 6.0 |
| Time, minutes | 15 | 15 | 15 | 15 | >20 | 15–20 | >20 |

*Comparative Example
[a]Cedepal ® FA-406, Stepan Company
[b]alkyl containing T resin, methoxy stopped, viscosity = 25–70 cps, 70% solids, available from GE Silicones
[c]SF1708, 0.8 meq/gm aminofunctional fluid, available from GE Silicones
[d]SM2115, microemulsion based on SF1708
[e]Sodium dodecyl sulfate, available from Aldritch Chemical Co.
[f]Igepal CO660, ethoxylated nonyl phenol, available from ISP, Inc.
[g]Silanol stopped dimethyl siloxane RTV, viscosity of about 30,000 cps, available from GE Silicones
[h]Dimethoxy stopped dimethyl siloxane RTV, viscosity of about 30,000 cps, available from GE Silicones
[i]10% MQ resin in xylene From Table 1 above, it can be seen that the compositions containing the high molecular weight silicones exhibited significantly improved froth stability over the compositions without the high molecular weight silicones.

EXAMPLES 4–8

Froths were prepared from mixtures of 97.5 weight percent water, 0.5 weight percent Cedepal® FA-406, surfactant commercially available from Stepan Company, and 2 weight percent of silicone blends. The silicone blend was prepared from 90 weight percent DF1040 and 10% of varying MQ resins. The results, along with compositional data are set forth below in Table 2.

TABLE 2

| Example | 4 | 5 | 6 | 7 | 8 |
|---|---|---|---|---|---|
| Composition, wt % | | | | | |
| Water | 97.5 | 97.5 | 97.5 | 97.5 | 97.5 |
| Surfactant[a] | 0.5 | 0.5 | 0.5 | 0.5 | 0.5 |
| DF1040[b] | 1.8 | 1.8 | 1.8 | 1.8 | 1.8 |
| Silicone | 0.2[c] | 0.2[d] | 0.2[b] | 0.2[e] | 0.2[f] |
| Froth Height, inches | | | | | |
| 15 sec. | 2.75 | 2.0 | 1.5 | 1.75 | 2.5 |
| 30 sec. | 2.0 | 1.5 | 1.0 | 1.5 | 2.0 |
| 60 sec. | 1.0 | 1.0 | 1.0 | 1.0 | 1.0 |

[a]Cedepal FA-406, Stepan Company
[b]DF1040, alkyl containing T resin, methoxy stopped, viscosity = 25–70 cps, 70% solids, available from GE Silicones
[c]SR882M, phenyl-containing T resin, viscosity = 200–900 cps, 80% solids, available from GE Silicones
[d]SR165, phenyl-containing T resin, viscosity 300–1200 cps, 86% solids, available from GE Silicones
[e]T resin, methoxy stopped, viscosity = 15–50 cps, 60% solids
[f]88186, MQ resin, 60% solids, viscosity = 11–16 cps, available from GE Silicones From Table 2 above it can be seen that a variety of high molecular weight silicones provide the significant froth stability benefits of the present invention.

EXAMPLES 9–11

The procedure of Examples 4–8 are followed except employing a 95:5 DF1040:Silicone blend. The results are set forth in Table 3 below.

TABLE 3

| Example | 9 | 10 | 11 |
|---|---|---|---|
| Composition, wt % | | | |
| Water | 97.5 | 97.5 | 97.5 |
| Surfactant[a] | 0.5 | 0.5 | 0.5 |
| DF1040[b] | 1.9 | 1.9 | 1.9 |
| Silicone | 0.1[c] | 0.1[d] | 0.1[e] |
| Froth Height, inches | | | |
| Initial | 3.25 | 3.75 | 3.0 |
| 15 sec. | 3.0 | 3.75 | 3.0 |
| 30 sec. | 2.95 | 3.5 | 2.95 |
| 60 sec. | 2.95 | 3.5 | 2.95 |

[a]Cedepal ® FA-406, Stepan Company
[b]Alkyl containing T resin, methoxy stopped, viscosity = 25–70 cps, 70% solids, available from GE Silicones.
[c]SR882M phenyl-containing T resin, viscosity = 200–900 cps, 80% solids, available from GE Silicones.
[d]SR165, phenyl-containing T resin, viscosity 300–1200 cps, 86% solids, available from GE Silicones.
[e]88186, MQ resin, 60% solids, viscosity = 11–16 cps, available from GE Silicones.

EXAMPLES 12–14

The procedure of Examples 4–8 are followed except employing a 90:10 DF1040:Silicone blend. The results are set forth in Table 4 below.

TABLE 4

| Example | 12 | 13 | 14 |
| --- | --- | --- | --- |
| Composition, wt % | | | |
| Water | 97.5 | 97.5 | 97.5 |
| Surfactant[a] | 0.5 | 0.5 | 0.5 |
| DF1040[b] | 1.8 | 1.8 | 1.8 |
| Silicone | 0.2[c] | 0.2[d] | 0.2[e] |
| Froth Height, inches | | | |
| Initial | 4.0 | 4.0 | 3.5 |
| 15 sec. | 4.0 | 4.0 | 3.25 |
| 30 sec. | 3.95 | 3.95 | 3.15 |
| 60 sec. | 3.95 | 3.95 | 2.0 |

[a]Cedepal ® FA-406, Stepan Company
[b]Alkyl containing T resin, methoxy stopped, viscosity = 25–70 cps, 70% solids, available from GE Silicones
[c]SR882M phenyl-containing T resin, viscosity = 200–900 cps, 80% solids, available from GE Silicones.
[d]SR165, phenyl-containing T resin, viscosity 300–1200 cps, 86% solids, available from GE Silicones.
[e]88186, MQ resin, 60% solids, viscosity = 11–16 cps, available from GE Silicones.

EXAMPLES 15–17

The procedure of Examples 4–8 are followed except employing a 85:15 DF1040:Silicone blend. The results are set forth in Table 5 below.

TABLE 5

| Example | 15 | 16 | 17 |
| --- | --- | --- | --- |
| Composition, wt % | | | |
| Water | 97.5 | 97.5 | 97.5 |
| Surfactant[a] | 0.5 | 0.5 | 0.5 |
| DF1040[b] | 1.7 | 1.7 | 1.7 |
| Silicone | 0.3[c] | 0.3[d] | 0.3[e] |
| Froth Height, inches | | | |
| Initial | 4.0 | 4.0 | 3.75 |
| 15 sec. | 4.0 | 4.0 | 3.75 |
| 30 sec. | 3.95 | 3.95 | 3.5 |
| 60 sec. | 3.95 | 3.95 | 3.5 |

[a]Cedepal ® FA-406, Stepan Company
[b]Alkyl containing T resin, methoxy stopped, viscosity = 25–70 cps, 70% solids, available from GE Silicones
[c]SR882M phenyl-containing T resin, viscosity = 200–900 cps, 80% solids, available from GE Silicones.
[d]SR165, phenyl-containing T resin, viscosity 300–1200 cps, 86% solids, available from GE Silicones.
[e]88186, MQ resin, 60% solids, viscosity = 11–16 cps, available from GE Silicones.

From the data in Tables 3, 4 and 5 it can be seen that very stable froths can be prepared in accordance with the present invention.

The above-mentioned patents are hereby incorporated by reference.

Many variations of the present invention will suggest themselves to those skilled in the art in light of the above-detailed description. All such obvious modifications are within the full intended scope of the appended claims.

We claim:

1. A method for preparing a water-repellent wallboard comprising the steps of:
   (a) delivering a water-repellent composition consisting essentially of water, at least one surfactant, a hydrogen-modified siloxane, and a high molecular weight silicone to a mixer;
   (b) delivering gypsum to said mixer and mixing to form a gypsum-containing mixture of water, at least one surfactant, a hydrogen-modified siloxane, a high molecular weight silicone, and gypsum;
   (c) and applying said gypsum-containing mixture in between at least two sheets of gypsum paper to form water-repellent wallboard.

2. A method as defined in claim 1 further comprising the step of (d) heating the water-repellent wallboard of step (c) to a temperature in the range of 75° to 500° C. for a period of time varying from 1 second to 10 minutes.

* * * * *